May 28, 1968   G. E. MANNING   3,385,408
AUTOMATICALLY ENGAGED VISCOELASTIC LIQUID SHEAR CLUTCH
Filed Feb. 3, 1966   2 Sheets-Sheet 1

INVENTOR.
George E. Manning
BY
A. H. Caser
Attorney

May 28, 1968 — G. E. MANNING — 3,385,408
AUTOMATICALLY ENGAGED VISCOELASTIC LIQUID SHEAR CLUTCH
Filed Feb. 3, 1966 — 2 Sheets-Sheet 2

INVENTOR.
George E. Manning
BY A. H. Caser
Attorney

United States Patent Office 3,385,408
Patented May 28, 1968

3,385,408
AUTOMATICALLY ENGAGED VISCOELASTIC
LIQUID SHEAR CLUTCH
George E. Manning, Columbus, Ohio, assignor to Mobil
Oil Corporation, a corporation of New York
Filed Feb. 3, 1966, Ser. No. 524,711
5 Claims. (Cl. 192—58)

ABSTRACT OF THE DISCLOSURE

An improved automatic clutch is provided in which a viscoelastic liquid is employed for transmission of power through a viscous drag effect between driving and driven plates. When the clutch is not engaged, the plates are held out of driving engagement by a spring. The normal force phenomenon is relied upon to bring the plates into operative engagement.

This invention relates to a clutch which controls its own engagement, sometimes designated an automatic clutch. It particularly relates to a clutch of this type in which a liquid is employed not only to transmit power but also to control engagement, and in which the clutch is disengaged when the drive is stopped and engages some time after the drive is started.

While of broad utility, the clutch is of particular use in the drive train between a power source characterized by exhibiting low starting torque, such as an AC electric motor, and a load that requires a high starting torque, i.e., a high friction load such as a conveyor or a rotary kiln, or a high inertia load such as a large press. If directly connected to the load, the motor would be expected to stall, or to overheat and eventually become damaged. In such a drive train the present clutch engages only slowly when the motor is started, so that its torque capacity is small, but as it gradually becomes fully engaged, it is able to transmit full torque. By thus deferring full engagement until the motor has attained a good measure of speed, there is obtained a reduction in the starting-current load imposed on the motor, or on asociated switchgear. While conventional clutches, such as a form of centrifugally actuated clutch, are employed for this purpose, the present clutch provides advantages in quiet, smooth operation and shock attenuation when fully engaged. Structurally, it has the advantages of mechanical simplicity, tolerance to imprecision, and mechanical compactness in respect of form and weight.

In essence, the clutch comprises a rotatable driving plate and axially spaced therefrom an axially movable rotatable driven plate. The adjacent surfaces of the plates form a pair of power transmitting surfaces having a clearance therebetween which is filled with a viscoelastic liquid. When the clutch is engaged, the clearance is reduced to such an extent that the driving plate transmits torque to the driven plate by means of the viscous drag of this liquid. When the clutch is stationary or disengaged, means in the form of a spring acts on the driven plate to maintain the said clearance at a width too large for effective torque transfer through the liquid. The liquid is characterized by the fact that upon rotation of the driving plate, it is subjected to a rotary shearing stress, as a result of which it undergoes rotary shear and produces a force normal to the said plates. A further characteristic of the liquid is that this normal force is greater adjacent the axis of rotation of the driving or driven plate than at points remote from such axis. Therefore, when the driving plate is rotated by the power source, generating shear in the liquid and producing a normal force, the said liquid of greater normal force is transferred, by means of axial passages in the driven plate, to the surface of the latter which is opposite the said power transmitting surface, where it exerts pressure sufficient to axially move the driven plate toward the driving plate. The effect of such movement is to decrease the width of the clearance so that, as described, the driving plate is able to transmit torque to the driven plate by means of the power transmitting surfaces and the described viscous drag effect.

The invention may be further understood by referring to the accompanying drawings, where FIG. 1 is a side view, in cross section, showing the clutch in disengaged or stationary position;

Figure 1:
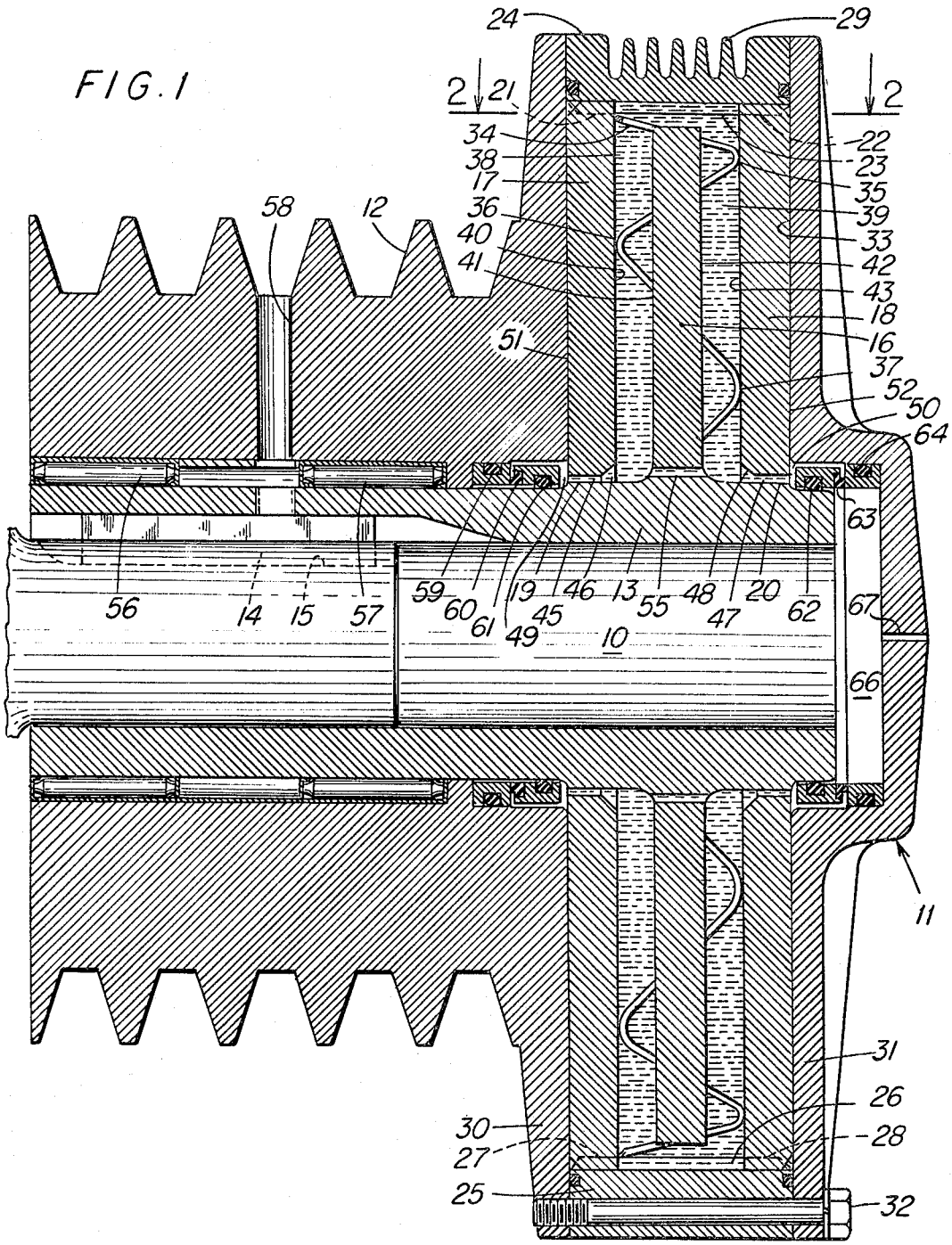

In FIG. 1 there is shown a driving member comprising the shaft 10 and a driven member comprising the rotatable housing or drum 11 and the integrally connected pulley 12.

The driving member also comprises the outer hollow shaft 13 which rotates with shaft 10 by virtue of the interengaging key and keyway 14, 15. Shaft 10 is driven by means not shown. Inside the housing 11, the shaft 13 carries a driving plate 16 which is fixedly mounted thereon and rotatable therewith.

The driven member further comprises the driven plates 17, 18, which are interleaved with the pltae 16, each being centrally apertured at 19, 20 for mounting on and rotation relatively to shaft 13. Plates 17, 18 are of larger diameter than plate 16 and the peripheral portions thereof are slotted at 21, 22 to receive a key 23 attached to the inner side of annular wall portion 24 which forms a part of the housing 11. Plates 17, 18 also engage the annular wall portion 25, disposed 180° away from the portion 24, by means of a key and keyway arrangement at 26, 27 and 28. It may be noted that wall portion 24 is serrated or finned at 29 to dissipate heat, while the portion 25 is fixed to the housing end pieces 30, 31, as by means of bolts, one of which is shown at 32. The portions 24, 25 may suitably alternate around the circumference of the housing 11. The end piece 30 of the housing is preferably integral with pulley 12.

Figure 2:
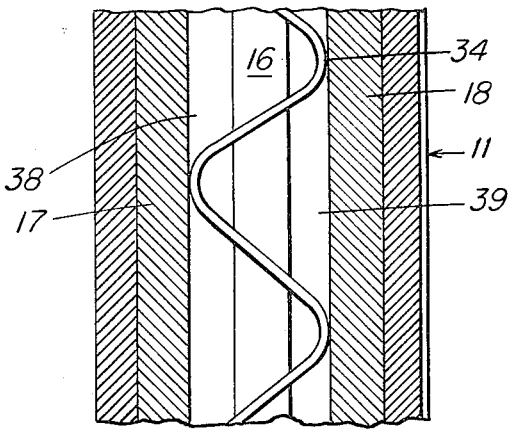
FIG. 2 is a view along the line 2—2 of FIG. 1 in which part of the construction is omitted for greater clarity.

It will be seen that the housing encloses a chamber 33 within which the plates 16, 17 and 18 are disposed, with plate 16 substantially bisecting the chamber. When the clutch is stationary or inoperative, disengaging means in the form of the spring means 34 maintains each driven plate out of driving engagement with the driving plate. The spring 34 extends sinuously around the plate 16, being spaced just beyond the peripheral edge of the latter, and alternately bears on plates 17 and 18, as at 35, 36, 37, etc. Note FIG. 2. It will be understood that the spring does not touch the plate 16. Spring 34 thus axially spaces axially movable plates 17 and 18 away from plate 16 such that clearances exist at 38, 39.

A viscoelastic liquid fills the spaces in chamber 33 and serves several functions, one of which is to provide a driving connection between the driving and the driven plates through the phenomenon of viscous drag. For such connection, the radial surfaces 40, 41 on each side of clearance 38 form a pair of power transmitting surfaces, and this is also true of radial surfaces 42, 43 on each side of clearance 39. However, to be operative the viscous drag effect requires the surfaces of each pair 40, 41 and 42, 43, and of course the involved plates, to be closer to each other than as shown in FIG. 1; in other words, the clearances 38, 39 are too wide for the effect to take place.

By virtue of another function of the liquid, plates 17, 18 may be brought closer to plate 16 to permit operation of the viscous drag effect. In this case, consider the shaft 10 to be rotated by the power source; this means that shaft 13 and plate 16 are also rotated. Plate 16 thus supplies a rotary stress to the liquid in clearances 38 and 39 which then undergoes rotary shear and produces a force normal to the plates. The direction of this force is toward the plates 17 and 18 and thus tends to move them further away from plate 16; however, a characteristic of normal force so produced is that the force is greater adjacent the axial center of plates 17, 18 than at more remote points, i.e., points nearer the periphery of the plate. Advantage is taken of this fact by providing axial passages in each driven plate, as at 45, 46 and 47, 48. These passages are radially spaced in each plate, and as shown, the passages 46 and 48 serve as flared entrances for the passages 45 and 47. By means of these passages, the liquid of maximum normal force in the clearance 39 may transfer through passages 48 and 47 into the gap at 50 and thence along the gap 52 where it exerts pressure sufficient to axially move plate 18 toward plate 16, note FIG. 3, thereby to decrease the clearance 39 and render the driving connection operative. Such driving connection, as described, is effected by means of the viscous drag of the liquid between and in contact with the power transmitting surfaces 42 and 43.

Similarly, liquid transfers through the axial passages 46, 45 into gap 49 and thence into gap 51 where it exerts pressure sufficient to axially move the plate 17 toward the plate 16, thus decreasing gap 38 and rendering operative the driving connection between plates 16 and 17.

Although not readily apparent in FIG. 1, gaps 51 and 52 are of definite size and are readily entered by the liquid. At 55 is shown one of a series of radially arranged passages in plate 16, the purpose of which is to favor transfer and balance of the liquid of increased normal force. Thus, if such liquid on the right side of plate 16, as seen in FIG. 1, does not readily enter passages 48, 47, an opportunity is provided for it to transfer through passage 55 and join the liquid in clearance 38 which is moving into passages 46, 45. Similarly, passage 55 provides for transfer in the opposite direction.

Figure 3:
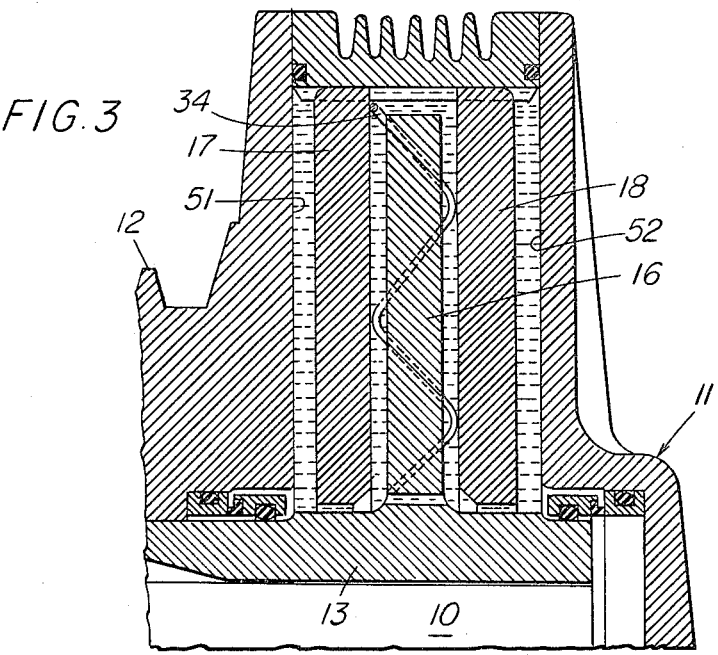
FIG. 3 is a view like FIG. 1 but of only a part of the construction and showing the clutch in engaged position.

As seen in FIG. 3, the axial movement of plates 17 and 18 has the effect of compressing the sine waves of spring 34 along its length, thereby flattening the same, so to speak. It will be understood that the spring is of finite length, i.e., has two free ends, to permit it to be flattened. The spring will remain in the described state of compression as long as shafts 10 and 13 and plate 16 rotate to subject the liquid to rotary stress. When such rotation stops, no stress is applied to the liquid, there is no normal force developed by it, and plates 17 and 18 come under control of spring 34, which moves them to the position seen in FIG. 1.

During the time the clutch is engaged, it will be understood that plates 17 and 18 are rotated, together with drum 11 and pulley 12, the latter of which will be connected to a desired load. The pulley may rotate relatively to shaft 13 by means of the roller bearings 56 and 57. At 58 is a passage for introduction of lubricant. Oil seals are provided at 59, 60, 61 and at 62, 63, 64.

It may be mentioned that liquid pressure in the gap 51 may be maintained by use of close fitting parts and/or a positive seal, to prevent liquid from being forced past the key and keyway structures at 23 and 21. This also applies to the maintenance of liquid pressure in gap 52.

The space 66 to the right of shaft 10, together with the opening 67, allow breathing during temperature gradients, thus preventing pressure buildup.

Besides those described, other functions of the liquid include a lubricating effect and a cooling effect.

Figure 4:
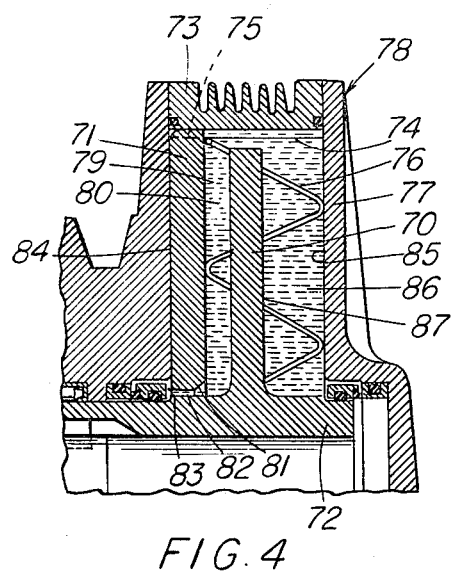
FIG. 4 is a view like FIG. 3, on a smaller scale, showing a modification.

In FIG. 4, a modification is shown which illustrates the use of one driving plate, as at 70, and only one driven plate, as at 71. Both plates are mounted on shaft 72 in the same way as in FIG. 1, and plate 71 is connected to the housing 73 by a key and keyway arrangement 74, 75 as in FIG. 1. A spring 76 functions like spring 34 except that the end wall 77 of the rotatable housing 78 is used to support the spring on one side with the plate 71 on the other side. In other respects, the construction is the same as in FIG. 1. In operation, liquid 79 in clearance 80 is subjected to rotary stress by rotation of plate 70, thereby inducing shear in the liquid and providing a normal force of the kind described. Liquid of greater than average normal force is transferred through axial passages 81, 82 into the clearance 83 and then into gap 84 where it forces the plate 71 axially to the right, thus decreasing the clearance 80 until it is narrow enough to enable the viscous drag effect to become operative, whereby plate 71 is driven by plate 70. It will be understood that the liquid completely fills the chamber 85.

The clearance 86 on the non-driving side 87 of driving plate 70 is desirably larger, as shown, than clearance 80 in order to reduce shear or drag in the liquid in clearance 86 to a negligible amount, thus minimizing energy losses and promoting efficiency.

Regarding the liquid, it is described as viscoelastic, by which is meant a liquid which exhibits both viscous and elastic behavior; thus it has flow properties of a liquid and elastic properties of a solid. Besides being viscoelastic, the liquid is one which exhibits the phenomenon described, namely, during rotary shear, as brought about by the application of a rotary shearing stress, it produces a force normal to the described power transmitting surfaces. The direction of this force may be apparent from the following consideration: consider a pair of flat, circular, substantially parallel, coaxially disposed plates separated from each other by a small uniform gap which is filled with a liquid of the kind under consideration. If one of the plates is rotated relatively to the other, the normal forces produced express themselves as forces which try to move the plates further apart. This may illustrate the direction of the forces. It should also be noted that the normal forces occur along the common axis of rotation of the plates and also are distributed radially from the center of each plate to the periphery. The normal forces are greatest along the common axis and decrease steadily as one moves toward the periphery. At the periphery the normal forces are about zero. Summarizing, the normal forces are normal to the opposed radial surfaces of the plates; the forces occur along the axis of rotation of the plates and are radially distributed from such axis to the periphery; and the force is greatest along the axis of rotation and zero at the periphery. It will be understood that references to normal force have the foregoing significance.

As will be noted, the normal forces are greatest along the common axis of the aforementioned plates and decrease steadily as movement towards the periphery of the plates occurs. Thus, it is noted that the viscoelastic liquids, as opposed to non-viscoelastic liquids, tend to exhibit the behavior of flowing in an inwardly direction rather than in an outwardly direction, or standing still. This unusual behavior is explained from the standpoint that the elastic effect of these specific fluids is similar to that of a common rubber band, or series of rubber bands, in which the elasticity thereof is such that the pull is always towards the center rather than in an outwardly direction, when the rubber bands undergo stress by an isotropic, circular exertive pull. When the non-viscoelastic liquids are substituted for the viscoelastic liquids employed in the novel clutch mechanism of the present invention, such liquids do not flow in an inwardly, but, rather, in an outwardly direction.

The liquid is of course a viscous one, for it is by virtue of this property that the driving plates transmit motion through the liquid film to the driven plates. This type of drive is per se conventional, being known as a viscous-drag drive. A viscous liquid is required for a strong normal force effect.

An example of a suitable liquid is a 33% by weight solution in mineral oil of polyalkylmethacrylate of a viscosity average molecular weight of about 200,000. The mineral oil has a kinematic viscosity of about 15 centistokes at 100° F. and about 4 centistokes at 210° F. This solution exhibits an apparent viscosity of about 120 poises at a shear rate of one reciprocal second and at 77° F. At shear rates ranging from about 100 to 1,000 reciprocal seconds, and at a temperature of 77° F., the liquid exhibits a normal force, expressed as lbs. of total thrust, ranging from about 0.08 to about 0.7 lb. when tested in a parallel plate rheogoniometer having a shearing element of a radius of only 0.79 inch and a maximum speed of only about 100 r.p.m. This relationship between normal force and shear rate is not a linear one for this liquid. On scale up, the thrust value would reach a maximum of 28 lbs. at 1000 reciprocal seconds on increasing the radius of the shearing element to 5 inches; and if the rotary speed were increased 10 times, the shear rate would increase to 10,000 reciprocal seconds and the thrust, which increases less than linearly with shear rate, would increase to over 200 lbs. It is thus apparent that the liquid is capable of a normal force of substantial value.

Besides the liquid described, a number of viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in decalin or in o-dichlorobenzene, rubber in xylene or in benzene, polystyrene in decalin or in dimethylphthalate, methylcellulose or sodium carboxymethylcellulose in water, aluminum or calcium soaps of fatty or naphthenic acids dissolved in hydrocarbons, glue in water, etc.

Desirably these liquids should have an apparent viscosity in the range of about 1 to 1000 poises or more at a shear rate in the range of about 10,000 to 1 reciprocal seconds; and they may exhibit a normal force of up to several hundred pounds of thrust, or from a few tenths, or even hundredths, to one or two hundred p.s.i. These are illustrative values.

Of interest is the fact that when the shear zone is filled with liquid, the rotary speed of the shearing element or plate varies directly with the normal force, i.e., the normal force increases with increasing speed of the plate.

It is also interesting to note that while the rotary stress applied to a liquid increases with the shear rate, the normal force increases with the shear rate even more rapidly than the rotary stress. Thus, at a shear rate of 100 reciprocal seconds, the normal force may be up to 10 times greater, or more, than the rotary stress.

As an example illustrative of the invention, let it be assumed that an electric motor of 50 HP and 1750 r.p.m. is to drive a load having a breakaway or starting torque of twice the rated torque of the drive motor. A clutch, constructed as in FIG. 1, to transmit the power may have a driving plate of a radius of about 12 cm., measured to the outside of the active liquid zone, and a radius measured to the inside of the active liquid zone of about 4 cm. These values substantially define a plate of about 12 cm. radius having a central aperture of about 4 cm. radius. The maximum clearance (see 38 or 39 in FIG. 1) has a width of about 1 cm., and when the clutch is fully engaged, this value reduces to about 0.01 cm. The amount of liquid required is about 18 cc. (1.1 cu. in.) per HP, or a total of about 900 cc. The liquid may have an apparent viscosity of about 88 poises at a shear rate of one reciprocal second, and, with the clutch fully engaged, may exert a normal force, expressed as pressure, of about 16 p.s.i., which is sufficient to move the driven plates into operative engagement with the driving plate.

Some torque is transmitted by the clutch at startup but the amount is negligible. The maximum gap between the driving and driven plates regulates the starting torque transmitted. This gap must be finite to allow the shearing action to develop the normal forces and thus to initiate coupling.

Referring generally to the clutch, it may be pertinent to note that its physical size is substantially that of conventional friction clutches of comparable rating. The number of pairs of power transmitting surfaces is variable, thus it may have one, two, three or more, and of course there may be a plurality of driving plates. In the latter event, each driving plate has its own driven plate, as in FIG. 4, or driven plates, as in FIG. 1; in other words, if two driving plates are used, they may not share a driven plate since the latter must be free to move axially toward only one driving plate.

A preferred arrangement is to utilize both surfaces of the driving plate as power transmitting surfaces, as in FIG. 1. The maximum clearance between a pair of such surfaces occurs when the drive is stationary, and the amount of such clearance is variable depending on the physical design of the unit. The minimum clearance is such that metallic contact is avoided. The amount of liquid present in the clearances also depends on the physical design.

The engaging rate of the clutch may be varied over a wide range, as by controlling the flow of liquid and by suitable choice of the characteristics of the spring. The flow of liquid in the rotatable housing may be varied by choosing liquids of different viscosity and by varying the size of the axial passages. In regard to the spring, variations are possible in respect of the size of the wire and the wire material, and also in respect of the spring design or shape; thus a spring may be used in the form of a coil whose internal diameter is larger than the diameter of plate 16, note FIG. 1, but smaller than that of plates 17 and 18. In a similar way the capacity of the clutch may be varied. The clutch characteristics of low starting torque and eventual full torque may be realized by choice of a liquid having suitable characteristics of viscosity and normal force. This choice may also provide for the limitaton of the normal force in accordance with the strength of the clutch housing, seals and bearings.

It will be understood that the driving drum can be the driven one, and vice versa.

The term "liquid" means all fluids other than gases.

It will be understood that the invention is capable of obvious variations without departing from its scope.

In the light of the foregoing description, the following is claimed:

1. A clutch comprising rotatable driving and driven members, a rotatable driving plate drivingly connected to the driving member and axially spaced therefrom an axially movable, rotatable driven plate drivingly connected to the driven member, adjacent surfaces of the plates forming a pair of power transmitting surfaces with a clearance therebetween, a viscoelastic liquid in said clearance, said driving plate transmitting torque to the driven plate through the viscous drag of the liquid when the clutch is engaged, spring means acting on the driven plate for maintaining said clearance at a width too large for effective torque transfer through said liquid when the clutch is disengaged, said driven plate having axial passage means adjacent the axis of rotation thereof said liquid, upon rotation of the driving plate, being subjected to a rotary stress whereby it undergoes rotary shear and produces a force normal to said plates, said force being greater adjacent the axis of rotation of the driven plate than at points remote from said axis, said liquid of greater normal force transferring through said axial passage means to the surface of the driven plate opposite said power transmitting surface and exerting pressure between the driven member and the driven plate such as to axially move the driven plate toward the driving plate, thereby decreasing the width of said clearance so that the driving plate transmits torque to the driven plate through said power transmitting surfaces and said viscous drag effect.

2. The clutch of claim 1 wherein a driven plate is disposed on each side of the driving plate, thereby to form two pairs of said power transmitting surfaces.

3. The clutch of claim 1 wherein a plurality of driving plates and a plurality of driven plates are interleaved, thereby to form a plurality of said pairs of power transmitting surfaces.

4. A clutch comprising rotatable driving and driven members, a rotatable driving plate drivingly connected to the driving member and interleaved with a pair of axially movable, axially spaced rotatable driven plates drivingly connected to the driven member, adjacent surfaces of the plates forming pairs of power transmitting surfaces with a clearance between the surfaces of each said pair, a viscoelastic liquid in said clearances, said driving plate transmitting torque to the driven plates through the viscous drag of the liquid when the clutch is engaged, spring means acting on the driven plates for maintaining said clearances at a width too large for effective torque transfer through said liquid when the clutch is disengaged, said driven plates having axial passage means therethrough adjacent the axis of rotation thereof, rotation of the driving plate exerting a rotary stress on the liquid whereby it undergoes rotary shear and produces a force normal to said plates, said force being greater adjacent the axis of rotation of the driven plates than at points remote from said axis, said liquid of greater normal force transferring through said axial passage means to surfaces of the driven plates opposite said power transmitting surfaces and exerting pressure between the driven member and the driven plates such as to axially move the driven plates toward the driving plate, thereby decreasing the width of said clearance so that the driving plate transmits torque to the driven plates through said power transmitting surfaces and said viscous drag effect.

5. In a clutch comprising a driving member, a driven member, means intermediate said members for providing a driving connection therebetween, and means for disengaging said driving connection, the improvement comprisig a driving plate fixedly mounted on the driving member for rotation therewith, a pair of axially movable, axially spaced driven plates on the driven member mounted for rotation therewith and interleaved with said driving plate, said driven plates each having a central aperture for mounting on the driving member and being rotatable relatively thereto, said driven plates being of larger diameter than the driving plate and each having axial passage means therethrough adjacent said mounting of the driving plate on the driving member, said driven member comprising a rotatable drum enclosing said plates and forming a chamber which is substantially bisected by said driving plate, said disengaging means comprising spring means between said driven plates biassed to keep the same spaced axially apart, said driven plates also being biassed away from said driving plate to provide gaps therebetween which normally are of such width as to render said driving connection inoperative, adjacent radial surfaces of said driving and driven plates forming pairs of power transmitting surfaces, a viscoelastic liquid in said chamber characterized, when subjected to a rotary shearing stress, by undergoing rotary shear and producing a force normal to said power transmitting surfaces, said driving plate, by rotation thereof, applying a rotary stress to said liquid to cause the latter to undergo rotary shear and to produce said normal force, said liquid being further characterized by the fact that said normal force is greater adjacent central areas of said driving plate than adjacent more peripheral areas, said liquid of greater normal force being transferable through said axial passages of the driven plates to the surfaces of the latter opposite said power transmitting surfaces and exerting pressure thereon sufficient to axially move said driven plates toward said driving plate, thereby to decrease said gaps and to render said driving connection operative, said driving connection being effected by means of the viscous drag of the liquid between and in contact with said power transmitting surfaces.

References Cited

UNITED STATES PATENTS

| 2,714,946 | 8/1955 | Tenot et al. | 192—58 |
| 2,954,857 | 10/1960 | Palm | 192—58 |
| 3,101,825 | 8/1963 | Caroli et al. | 192—58 X |
| 3,209,874 | 10/1965 | Foster et al. | 192—58 |

BENJAMIN W. WYCHE, III, *Primary Examiner.*